(12) United States Patent
Setono

(10) Patent No.: US 7,701,820 B2
(45) Date of Patent: Apr. 20, 2010

(54) OPTICAL DISC APPARATUS

(75) Inventor: Shingo Setono, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 861 days.

(21) Appl. No.: 11/359,452

(22) Filed: Feb. 23, 2006

(65) Prior Publication Data

US 2006/0187781 A1    Aug. 24, 2006

(30) Foreign Application Priority Data

Feb. 24, 2005    (JP) .............................. 2005-048289

(51) Int. Cl.
  *G11B 7/00*    (2006.01)
  *G11B 5/09*    (2006.01)
(52) U.S. Cl. .................. 369/47.53; 369/116; 369/275.3
(58) Field of Classification Search ............. 369/47.55, 369/47.53, 30.18, 116, 53.15, 53.22, 53.37, 369/53.1, 59.21, 275.2, 275.3, 53.26
See application file for complete search history.

(56) References Cited

U.S. PATENT DOCUMENTS 5,706,271 A * 1/1998 Hashimoto ............... 369/53.37
6,704,263 B1 * 3/2004 Nijboer et al. ........... 369/59.21
6,735,153 B2 * 5/2004 Yoshida .................... 369/30.18
2005/0030861 A1 * 2/2005 Matsui et al. ............ 369/47.53
2006/0044972 A1 * 3/2006 Park ........................ 369/47.55

FOREIGN PATENT DOCUMENTS

| JP | 10-134389 A | 5/1998 |
| JP | 2001-229563 A | 8/2001 |
| JP | 2003-272157 A | 9/2003 |

\* cited by examiner

*Primary Examiner*—Peter Vincent Augustin
*Assistant Examiner*—Kim-Kwok Chu
(74) *Attorney, Agent, or Firm*—Crowell & Moring LLP

(57) ABSTRACT

An optical disc apparatus for recording information on a rewritable optical disc having a power calibration area (PCA) moves an optical pickup for optimum recording power calibration (OPC) from an innermost end to outward of the PCA, and stores an address where RF signal is first detected. If the stored address coincides with an address at the innermost end of the PCA, or if a usable area between the two addresses is smaller than to enable one-time OPC, the apparatus obtains an optimum recording power by overwriting on a used area at or near the innermost end of the PCA, and performs DC erase using the obtained optimum recording power. This enables DC erase and restoration of the PCA back to a usable area even if the PCA has no usable area at its innermost end, and even if it is difficult to detect a usable area in the PCA.

2 Claims, 5 Drawing Sheets

OPTICAL DISC APPARATUS

BACKGROUND OF THE INVENTION

1. Field of the Invention

The present invention relates to an optical disc apparatus for recording information on, and erasing recorded information from, a rewritable optical disc having a power calibration area for optimum recording power calibration.

2. Description of the Related Art

A rewritable optical disc such as a DVD-RW (Rewritable) as well as a write-once optical disc such as a DVD (Digital Versatile Disc)-R (Recordable) has a test recording or writing area which is referred to as power calibration area (hereafter simply as "PCA"). An optimum recording power can be obtained by test recording, more specifically recording test data in the PCA with different powers of laser beam, and reproducing the recorded test data, which can be referred to as optimum recording power calibration or control (hereafter simply as "OPC"). In the case of a rewritable optical disc such as a DVD-RW, the data recorded in the PCA by the test recording can be erased, in contrast to the case of a write-once optical disc. Thus, if the OPC is repeated to cause the PCA to run out of free space (unused or usable area) for further test recording, it is possible to erase the data recorded by test recordings in the PCA so as to create a free space, thereby enabling further OPC.

When the PCA runs out of free space due to the repetition of the OPC, data recorded in the PCA by the test recording is erased by a laser beam (erase laser) using a constant power (DC voltage) which is not in pulse form, so as to restore a used area of the PCA back to a usable area. Because of the use of DC voltage, the operation to erase the data in the used area in the PCA is called "DC erase". Here, the power of the laser beam for performing the DC erase (DC erase laser power) is also set to be optimum based on the optimum recording laser power obtained using the PCA. So, normally, a portion of the PCA is kept unused to enable or carry out the OPC at least one time in the case where test data are repeatedly recorded in the PCA.

There is a technical standard for the process of repeatedly recording test data in PCA of a rewritable optical disc. An optical disc apparatus of a first type uses this technical standard. The technical standard recommends using the PCA continuously from an outer radial position toward an inner radial position of the optical disc. Based on this recommendation, an innermost end of an area having test data recorded therein (i.e. used area) in PCA can be determined in the following manner. That is, first, an optical pickup in the first type of optical disc apparatus is moved to seek from a radially innermost end of PCA to radially outward of the rewritable optical disc in order to detect a free space (usable area) in the PCA when starting OPC. Note that in the present specification, the term "radially" is used to mean "in a direction along a radius of an optical disc".

During the seek movement, the optical pickup receives a reflected laser beam which may contain a reproduction signal. The first type of optical disc apparatus determines that the position of the optical pickup at an address in the PCA, at the time of first detecting the reproduction signal after detecting a free space in the PCA, is the radially innermost end of the used area in the PCA, thereby identifying the usable area (free space) in the PCA. Note in this connection that normally the PCA has an area called RMA (Recording Management Area) to record an address of an area of the last performed OPC. By reading the address recorded in the RMA, the address of the used area can be obtained. However, the address recorded in the RMA is not always renewed as a new address. Thus, in order to securely detect a usable area in the PCA, the above-described manner of identifying the usable area is generally used.

Once the usable area in the PCA of the rewritable optical disc is identified, the first type of optical disc apparatus performs OPC at an outermost position in the usable area (i.e. position neighboring the used area) in a manner provided by the above-described technical standard. If only about a portion of the PCA is kept unused as the usable area to enable or carry out the OPC just one time (i.e. if the PCA is almost completely used up), the optical disc apparatus performs the OPC in the usable area so as to obtain an optimum recording power (laser power). Using the thus obtained optimum recording power, and based on a known predetermined relationship between optimum recording power and optimum erase (DC erase) power, the optical disc apparatus obtains an optimum erase power (laser power), and performs DC erase based on the thus obtained optimum erase power. By subjecting the entire area, except e.g. recording management area, of the PCA (hereafter such entire area being referred to often as "entire substantial area") to the DC erase (such), the entire substantial area of the PCA is restored to a usable area spanning from a radially innermost end to a radially outer end of the PCA. For starting e.g. recording on the optical disc thereafter, the first type of optical disc apparatus first operates its optical pickup to detect the usable area thus restored in the PCA from the radially innermost end of the PCA in the optical disc, and to seek radially outwardly therefrom, so as to use the usable area (free space) of the PCA for OPC.

On the other hand, there is a known technology in which after an entire area of PCA in a rewritable optical disc is once completely used up, a portion of the PCA to be used for a subsequent OPC is randomly set. A second type of optical disc apparatus uses this technology. In the second type of optical disc apparatus, there is a possibility that a certain area of the PCA is used by far more frequently than the other of the PCA. Thus, an improved process has been developed for the second type of optical disc apparatus in which, after each test recording in a then free space of the PCA, a portion of the PCA from the front end of the each test recording area to a certain inner position of the PCA is subjected to erasure to form or create a new free space of the PCA. By retrieving and setting this new free space for a subsequent test recording, a subsequent test recording can be easily performed in the second type of optical disc apparatus, even after the entire area of the PCA is once completely used up (refer to e.g. Japanese Laid-open Patent Publication 2003-272157).

As apparent from the foregoing, the first and second types of optical disc apparatus are different from each other with respect e.g. to the process of recording test data in PCA, the process of detecting a usable area in the PCA, and the process of performing DC erase when the PCA is completely or almost completely used up. However, a rewritable optical disc can be mounted on either of the two different types of optical disc apparatus. When one optical disc is actually mounted for use on the two different types of optical disc apparatus, which are different from each other particularly in the process of DC erase, the following problem may occur.

Assume that a rewritable optical disc is first mounted on and used by an optical disc apparatus of the second type so as to form a usable area in PCA of the optical disc at a random position in the PCA (e.g. an intermediate position "ap" as shown in later described FIG. 5A). Further assume that the optical disc is thereafter mounted on an optical disc apparatus of the first type so as to subject the optical disc to recording or erasure. Under these assumptions, the first type of optical disc apparatus cannot detect the usable area formed by the second type of optical disc apparatus, resulting in detection failure, because the PCA of the optical disc does not have a usable area (free space) on a radially inner portion of the PCA, more specifically does not have a usable area spanning from a radially innermost end of the PCA up to the front end of the usable area formed by the second type of optical disc apparatus. Thus, the first type of optical disc apparatus cannot perform OPC, either. This problem needs to be solved.

Besides, it is to be noted that in connection with appropriate erasure of data on a rewritable optical disc, there are technologies to control the erase power. For example, a technology is known to prevent data recorded by test recording from being left unerased after DC erase (refer to e.g. Japanese Laid-open Patent Publication Hei 10-134389), in which the DC erase power is set to have a more appropriate value based on a signal reproduced from PCA after the DC erase. Furthermore, a technology is known to obtain an appropriate value of a laser output for erasure to be used for a rewritable optical disc (refer to e.g. Japanese Laid-open Patent Publication 2001-229563), in which the laser output irradiated onto a portion of the optical disc is varied, and an average reflectivity of the irradiated portion of the optical disc is measured, so as to determine an optimum laser output for erasure. However, these technologies are unable to solve the above-described problem.

SUMMARY OF THE INVENTION

An object of the present invention is to provide such an optical disc apparatus for recording information on a rewritable optical disc having PCA that prevents a situation where the optical disc apparatus cannot perform OPC because it cannot detect a usable area (free space) in the PCA depending on the location of the usable area in the PCA, and that can perform OPC at any time, when mounting the optical disc thereon and starting recording or erasure, regardless of where in the PCA the usable area is formed.

According to the present invention, the above object is achieved by an optical disc apparatus for a rewritable optical disc having a power calibration area for optimum recording power calibration, the apparatus comprising: an optical pickup for recording or erasing information on or from the optical disc by use of an optimum recording power obtained using the power calibration area; a used area detection unit for detecting a radially innermost end of a used area in the power calibration area based on a reproduction signal of a laser beam which the optical pickup receives during a seek movement, at the time of the optimum recording power calibration, by moving the optical pickup to seek from a radially innermost end to radially outward of the power calibration area; a remaining usable area determination unit for determining, based on the innermost end of the used area detected by the used area detection unit, whether the power calibration area has a remaining usable area which is an unused area beginning from the innermost end of the power calibration area, and which is of a size for carrying out the optimum recording power calibration at least one time; an optimum recording power obtaining unit for obtaining an optimum recording power (i) by performing the optimum recording power calibration at the innermost end of the power calibration area by partial or entire overwriting if the remaining power calibration area is smaller than a size for carrying out one-time optimum recording power calibration, and (ii) by performing the optimum recording power calibration in a portion of the remaining usable area in the power calibration area, which portion is neighboring and inner from the innermost end of the used area if the remaining usable area is equal to or larger than a size for carrying out one-time optimum recording power calibration; and a DC erase unit for erasing the used area in the power calibration area by use of the optimum recording power obtained by the optimum recording power obtaining unit using the used area in the power calibration area by the partial or entire overwriting, if the remaining usable area detection unit determines that the remaining usable area in the power calibration area is smaller than a size for carrying out one-time optimum recording power calibration.

The optical disc apparatus according to the present invention for recording information on a rewritable optical disc having a power calibration area (PCA) for optimum recording power calibration (OPC) can prevent a situation where the optical disc apparatus cannot perform OPC because it cannot detect a usable area (free space) in the PCA depending on the location of the usable area in the PCA (e.g. when a used area begins from an innermost end of the PCA). When mounting the optical disc on the optical disc apparatus and starting recording or erasure, the optical disc apparatus can perform OPC at any time by performing the OPC from the innermost end of the PCA, regardless of where in the PCA the usable area is located.

Preferably, the optimum recording power obtaining unit obtains the optimum recording power by overwriting on the used area from the innermost end of the power calibration area if the innermost end of the used area coincides with the innermost end of the power calibration area.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
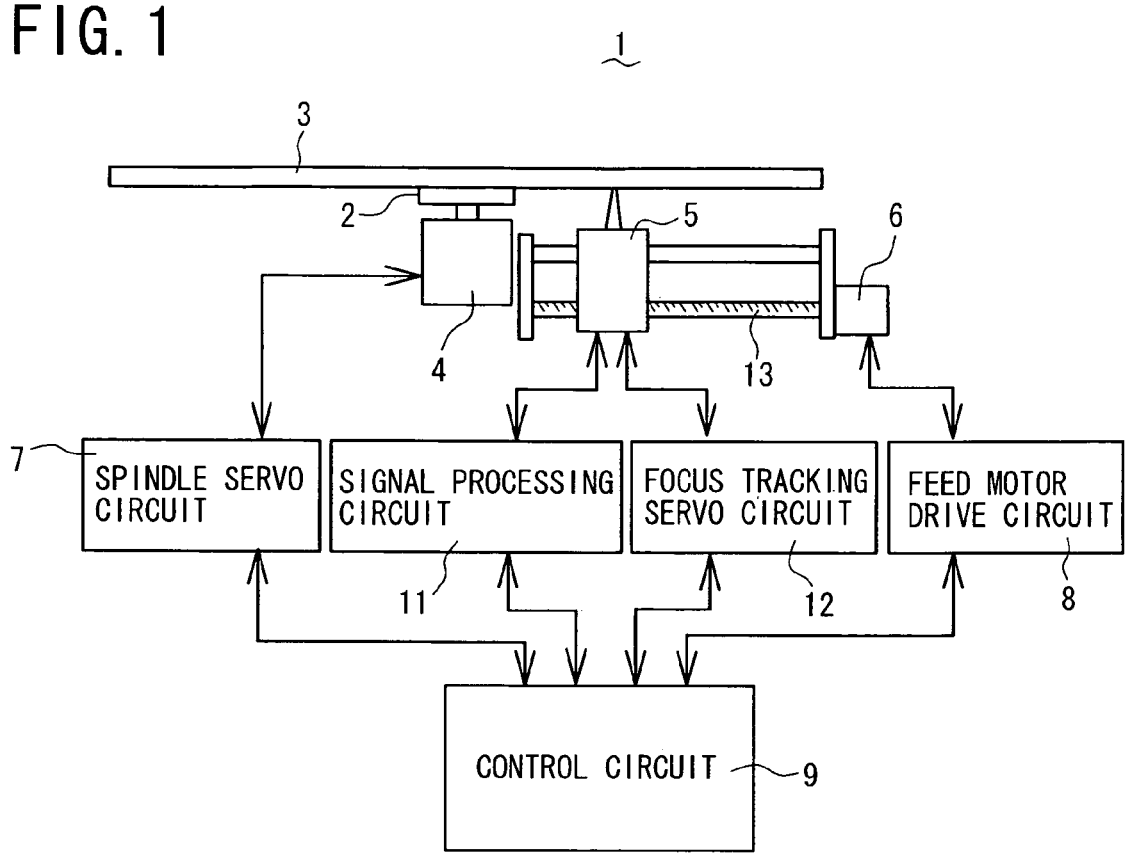
FIG. 1 is a schematic block diagram of an optical disc apparatus according to an embodiment of the present invention.

Embodiments of the present invention, as the best mode for carrying out the invention, will be described hereinafter with reference to the annexed drawings. Note that like parts are designated by like reference numerals or reference characters throughout the drawings. It is to be understood that the embodiments described herein are not intended as limiting, or encompassing the entire scope of, the invention. The following description exemplifies a case where the present invention is applied to an optical disc apparatus which has a DVD-RW (Digital Versatile Disc-Rewritable) mounted thereon as a rewritable optical disc having a power calibration area (PCA), and which can record various information such as video information on the optical disc (DVD-RW), and can reproduce or erase information recorded on the optical disc (DVD-RW).

FIG. 1 is a schematic block diagram of an optical disc apparatus 1 according to an embodiment of the present invention. As shown in FIG. 1, the optical disc apparatus 1 of the present embodiment for recording information on, and erasing recorded information from, a rewritable optical disc 3, comprises: a spindle motor 4 for rotating the rewritable optical disc 3 mounted on a turntable 2; a feed motor 6 coupled to a rotary guide screw 13 for moving an optical pickup 5 (having a semiconductor laser source) to seek in a radial direction of the optical disc 3; a spindle servo circuit 7 for servo-controlling the spindle motor 4; and a feed motor drive circuit 8 for driving the feed motor 6. The optical disc apparatus 1 further comprises: a signal processing circuit 11 for subjecting a reproduction signal from the optical pickup 5 to various signal processing, and outputs the thus processed signal to a later described control circuit 9; a focus tracking servo circuit 12 for controlling focus and tracking of the optical pickup 5; and a control circuit 9, formed of a microcomputer, for totally controlling the spindle servo circuit 7, the feed motor drive circuit 8, the signal processing circuit 11 and the focus tracking servo circuit 12. The control of the control circuit 9 includes comparisons of various data and determinations based on the comparisons.

When the control circuit 9 outputs, to the feed motor drive circuit 8, a command for moving the optical pickup 5 to seek, the feed motor drive circuit 8 drives the feed motor 6 to rotate. The rotation of the feed motor 6 causes the guide screw 13 to rotate so as to move the optical pickup 5 in a radial direction of the optical disc 3. The optical pickup 5 irradiates a laser beam onto the optical disc 3, and receives a reflected laser beam from the optical disc 3. The reflected laser beam contains an address on the optical disc 3 where the optical pickup 5 is positioned or located at each instant (at a current position). Thus, an address at each instant on the optical disc 3 is read from the reflected laser beam, and is used to determine a current position of the optical pickup 5. On the other hand, a current position of the optical pickup 5 in an area of the optical disc 3 having no recorded data (no recorded address) is determined by detecting LPP (Land Pre-Pits) pre-recorded on the optical disc 3. The control circuit 9 further controls the signal processing circuit 11 to output a control signal to vary (increase/decrease) the output of the semiconductor laser source in the optical pickup 5, so as to adjust the intensity (power) of the laser beam for recording, reproduction and erasure.

Figure 2:
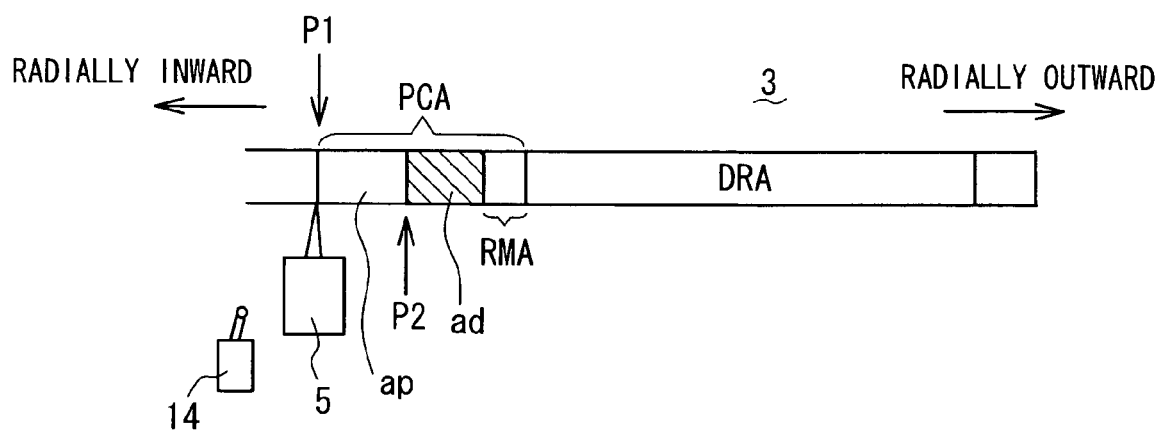
FIG. 2 is a schematic view showing an area structure on a rewritable optical disc relative to an optical pickup.

FIG. 2 is a schematic view showing an area structure on the rewritable optical disc 3 relative to the optical pickup 5. Referring to FIG. 2, the area structure will be described. Formed on the optical disc 3 according to the present embodiment are PCA (Power Calibration Area) and DRA (Data Recording Area) in order from an inner periphery to an outer periphery of the optical disc 3. Further, RMA (Recording Management Area) is formed on a radially outer portion of the PCA, more specifically in an area of PCA spanning from a radially outmost end of the PCA to a radially outmost end of a later described used area "ad".

The optical disc apparatus 1 has a detection switch 14 provided at a radially inner periphery of the optical disc 3 and operated by contacting the optical pickup 5. When the optical disc 3 is mounted on the optical disc apparatus 1, the optical pickup 5 is first moved radially inward until contacting the detection switch 14, and is stopped there at an initial position (zero position) of the optical pickup 5. The control circuit 9 determines this initial position as the movement origin of the optical pickup 5 thereafter.

Figure 3:
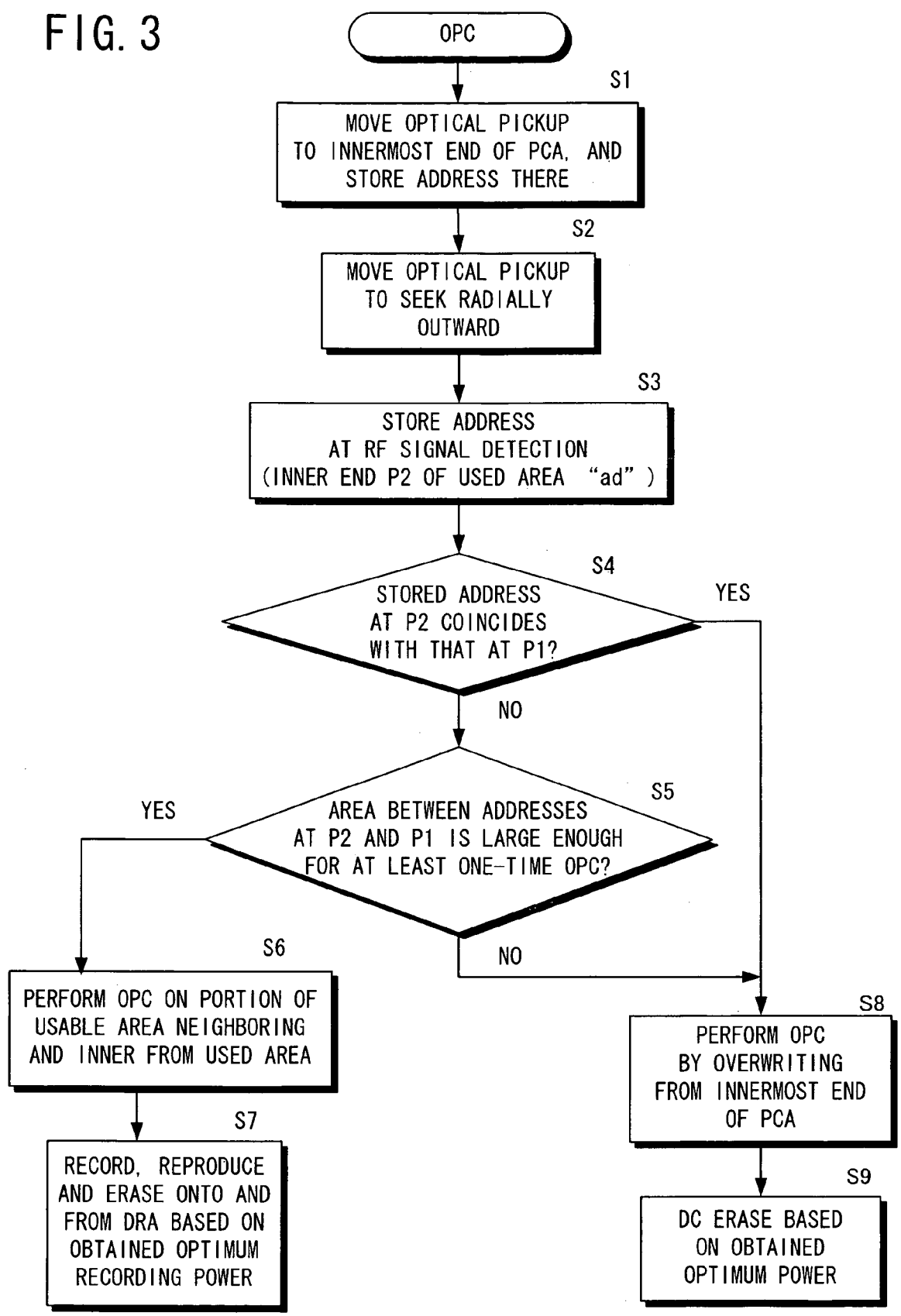
FIG. 3 is a flow chart showing a process of optimum power calibration (OPC)

Referring now to the flow chart of FIG. 3, a process of controlling a laser power for e.g. recording to an optimum level, namely optimum power calibration (OPC), will be described. The optical disc apparatus 1 performs the OPC on various occasions (new occasions) such as when a new optical disc 3 is mounted on the optical disc apparatus 1, or when an operational environment of the optical pickup 5 changes (e.g. temperature increase), or when the optical pickup 5 changes in its recording or reproduction position on the optical disc 3. When the OPC starts, the control circuit 9 outputs a predetermined signal to the feed motor drive circuit 8 to rotate the feed motor 6, so as to move the optical pickup 5 to seek to a radially innermost end P1 (refer to FIG. 2) of PCA (S1), and then to seek radially outward (to the right in FIG. 2) in the PCA (S2). In the step S1, the control circuit 9 further stores, in a memory therein, an address on the optical disc 3 corresponding to the radially innermost end P1 of the PCA.

When the optical pickup 5 reaches a position corresponding to an innermost end of a used area "ad" having test data recorded thereon, the control circuit 9 controls the optical pickup 5 to detect an RF signal in a laser beam which the optical pickup 5 receives, and which corresponds to the innermost end of the used area "ad". The control circuit 9 reads an address on the optical disc 3 corresponding to such position of the optical pickup 5 at the time of the RF signal detection, and stores the thus read address in the memory therein (S3). The thus read address corresponds to a radially innermost end P2 (refer to FIG. 2) of the used area "ad" in the PCA. Thus, the control circuit 9 along with the optical pickup 5 and other elements operating here serves as claimed "used area detection unit" for detecting an innermost end (radially innermost end) of the used area "ad".

If the control circuit 9 determines that the stored address corresponding to the innermost end P2 of the used area coincides with the stored address corresponding to the innermost end P1 of the PCA (YES in S4), determining that at least an innermost portion of the PCA is an used area, the control circuit 9 controls to obtain an optimum recording power (laser power) by a later described overwriting. Even if the control circuit 9 determines that the stored address corresponding to the innermost end P2 of the used area does not coincide with, the stored address corresponding to the innermost end P1 of the PCA (NO in S4), the control circuit 9 controls to obtain an optimum recording power by the later described overwriting, if the control circuit 9 determines that the size of the usable area "ap" between the stored address corresponding to the innermost end P2 of the used area and the stored address corresponding to the innermost end P1 of the PCA is less than enough, i.e. smaller than, to perform OPC at least one time (NO in S5).

On the other hand, if the control circuit 9 determines that the size of the usable area "ap" between the stored address corresponding to the innermost end P2 of the used area and the stored address corresponding to the innermost end P1 of the PCA is large enough to perform OPC at least one time (YES in S5), the control circuit 9 controls to perform normal OPC on a radially outer portion of the usable area "ap", namely an area of the usable area "ap" neighboring the used area "ad" (S6), so as to obtain an optimum recording power. Using the thus obtained optimum recording power, and based on a known predetermined relationship among optimum recording power, optimum reproduction power and optimum erase (DC erase) power, the control circuit 9 obtains an optimum erase power and an optimum reproduction power. Based on the thus obtained optimum recording power, optimum reproduction power and optimum erase power, the control circuit 9 controls to perform recording, reproduction and erasure onto and from the DRA (Data Recording Area) (S7). Thus, the control circuit 9 along with the optical pickup 5 and other elements operating here serves as claimed "remaining usable area determination unit" for determining whether the PCA has, or is absent of, a remaining usable area "ap" usable from the innermost end P1 of the PCA. More specifically, the "usable area determination unit" determines whether or not the PCA has a usable area of a size to enable OPC at least one time, and whether or not the usable area "ap" begins from the innermost end P1 of the PCA.

In the present specification, the term "normal OPC" is used to mean the following process. First, test data is continuously recorded on a PCA while moving the optical pickup 5 and at the same time increasing the recording power (laser power) from a low power in a predetermined stepwise fashion. The recorded test data is reproduced by a reproduction power (laser power) of a predetermined level, and is subjected to measurement of amplitude. The reproduced data first shows an increase of amplitude with an increase of the recording power (in a lower power range of the recording power), and reaches an inflection point after which the reproduced data shows a decrease of amplitude with an increase of the recording power (in a higher power range of the recording power). The inflection point found in this way corresponds to maximum amplitude of reproduced data. Thus, the recording power giving the inflection point or maximum amplitude of reproduced data is determined as an optimum recording power.

If YES in the step S4 or NO in the step S5, the control circuit 9 controls to obtain an optimum recording power by overwriting in the following manner. First, the control circuit 9 controls to move the optical pickup 5 to the radially innermost end P1 of the PCA. Then, while moving the optical pickup 5 from the innermost end P1 to outward of the PCA, the control circuit 9 controls to perform the normal OPC (S8). Thereby, the control circuit 9 determines a recording power to give maximum amplitude of reproduced data as an optimum recording power in the above-described process of the "normal OPC". Based on the known predetermined relationship between optimum recording power and optimum erase (DC erase) power, the control circuit 9 obtains an optimum erase power (laser power), and controls to perform DC erase based on the thus obtained optimum erase power (S9). Note here that in the present specification, the term "overwriting" is used to mean recording test data in a used area (recorded area) in PCA for OPC, in which one process of recording test data in a used area by the "overwriting" may or may not include recording a part of the test data in an unused (usable) area neighboring the used area. The overwriting including the unused area, i.e. overwriting on both used area and unused area is referred to herein as "partial overwriting".

Figure 4A:
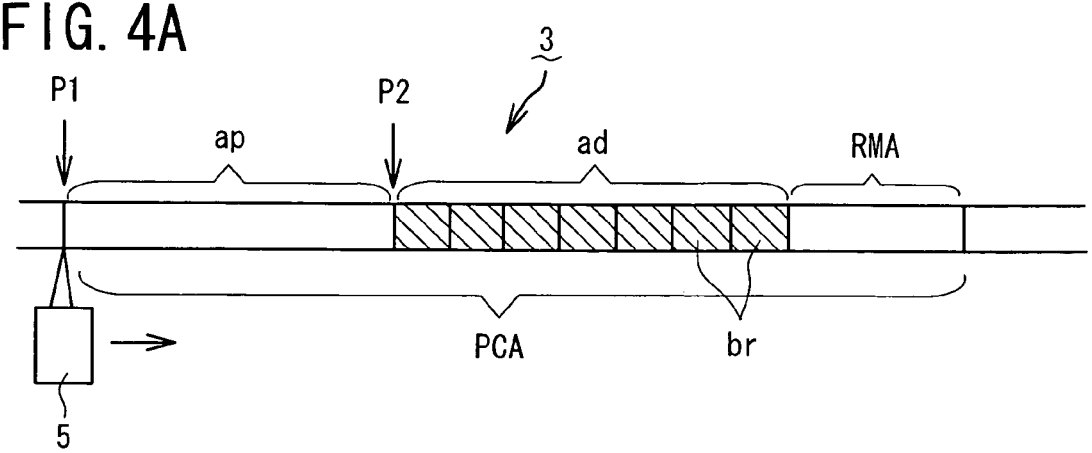
FIGS. 4A to 4D are schematic views, showing a portion of the optical disc mainly of a power calibration area (PCA) relative to the optical pickup, for explaining an operation mainly of the OPC which the optical disc apparatus performs with the optical disc having a used area in approximately a half of the PCA.
Figure 4B:
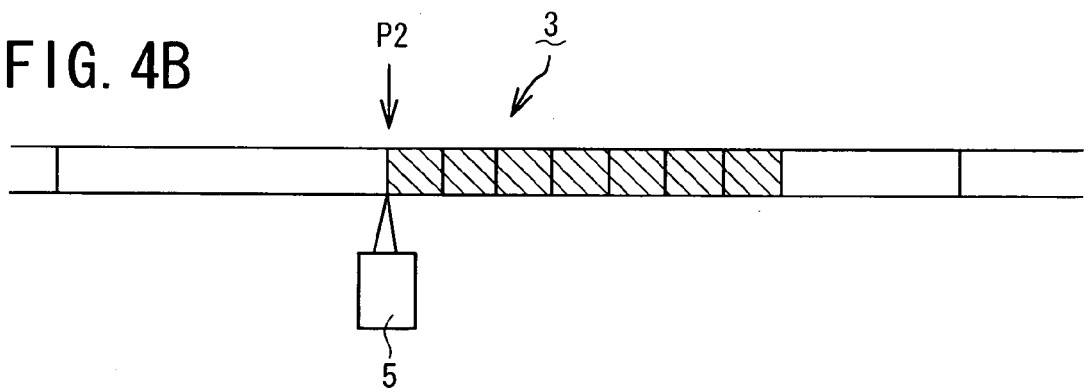
Figure 4C:
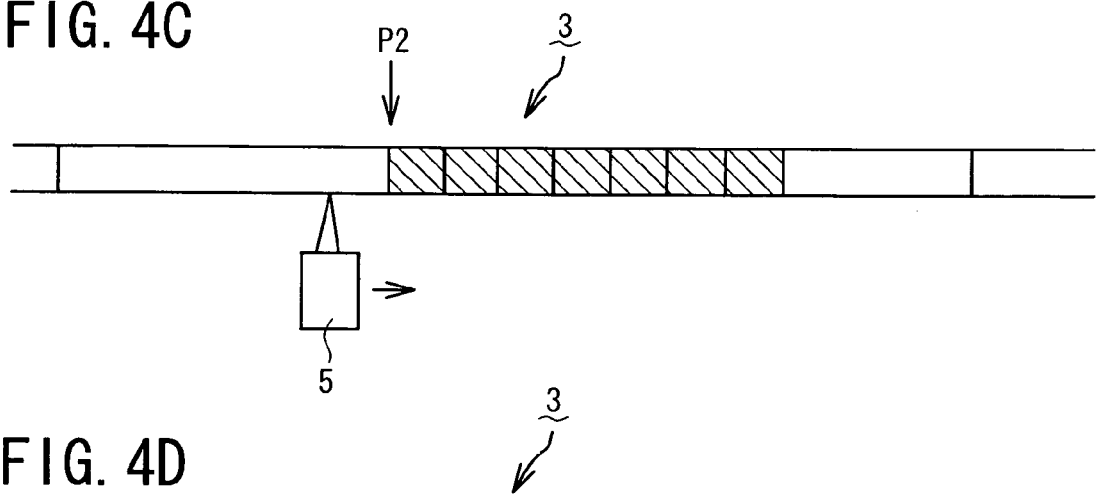
Figure 4D:
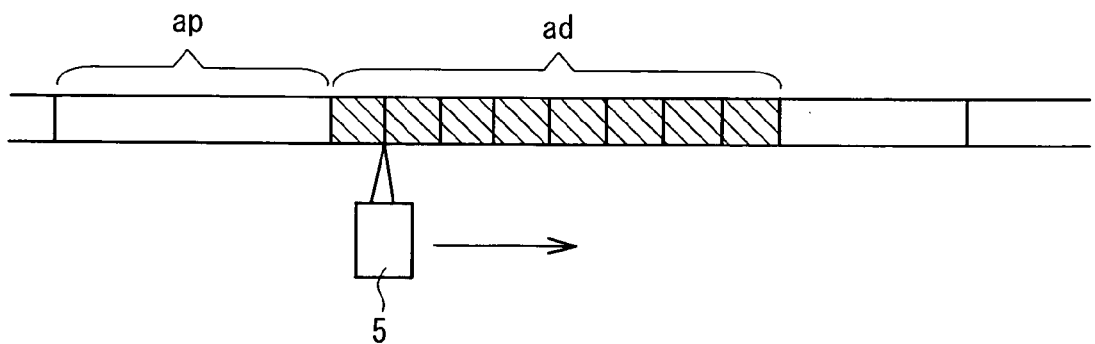

Referring now to FIGS. 4A to 4D, 5A to 5C, and 6A to 6C, various operations at the time of OPC (Optimum Power Calibration) will be described, depending on how a used area "ad" and a usable area (unused or free space) "ap" are formed in PCA. FIGS. 4A to 4D are schematic views, showing a portion of the rewritable optical disc 3 mainly of PCA relative to the optical pickup 5, for explaining an operation mainly of OPC which the optical disc apparatus 1 performs with the optical disc 3 having a used area "ad" in approximately a half of the PCA. In not only these FIGS. 4A to 4D but also FIGS. 5A, 5B, 6A and 6B, each hatched rectangular area "br" in the used area "ad" (the reference character "br" being indicated only in FIG. 4A representatively) represents an area of the PCA used for one-time OPC.

Referring to FIGS. 4A to 4D, when an OPC operation starts, the control circuit 9 first controls to move, from the innermost end P1 to outward of the PCA, the optical pickup 5 having been moved back to the innermost end P1 of the PCA (refer to FIG. 4A). Since the PCA has a usable space "ap" beginning from, or contiguous to, the innermost end P1, the control circuit 9 moves the optical pickup 5 to the innermost end P2 of the used area "ad". When the optical pickup 5 reaches the innermost end P2 of the used area "ad", the control circuit 9 controls to detect an RF signal of the used area "ad" at the innermost end P2, and thereby to stop the optical pickup 5 (refer to FIG. 4B).

While the optical pickup 5 moves from the innermost end P1 of the PCA to the innermost end P2 of the used area "ad", the control circuit 9 determines that the usable area "ap" is of a size enough to enable at least one-time OPC. Then, after the control circuit 9 controls to move back the optical pickup 5 inward by an amount necessary for one-time OPC, i.e. an amount corresponding to an area "br" (refer to FIG. 4C), the control circuit 9 controls to perform OPC using the area of the PCA in the amount necessary for the one-time OPC (refer to FIG. 4D), so as to obtain an optimum recording power (laser power). The used area "ad" increases and the usable area "ap" decreases by the amount of the one-time OPC.

Using the thus obtained optimum recording power, the control circuit 5 obtains an optimum reproduction power and an optimum erase power based on a known predetermined relationship among the optimum recording power, the optimum reproduction power and the optimum erase (DC erase) power. Using the thus obtained optimum recording power, optimum reproduction power and optimum erase power, the control circuit 5 controls to subject the DRA area of the optical disc 3 to recording, reproduction and erasure after moving the optical pickup 5 to the DRA area from the position corresponding to P2.

Figure 5A:
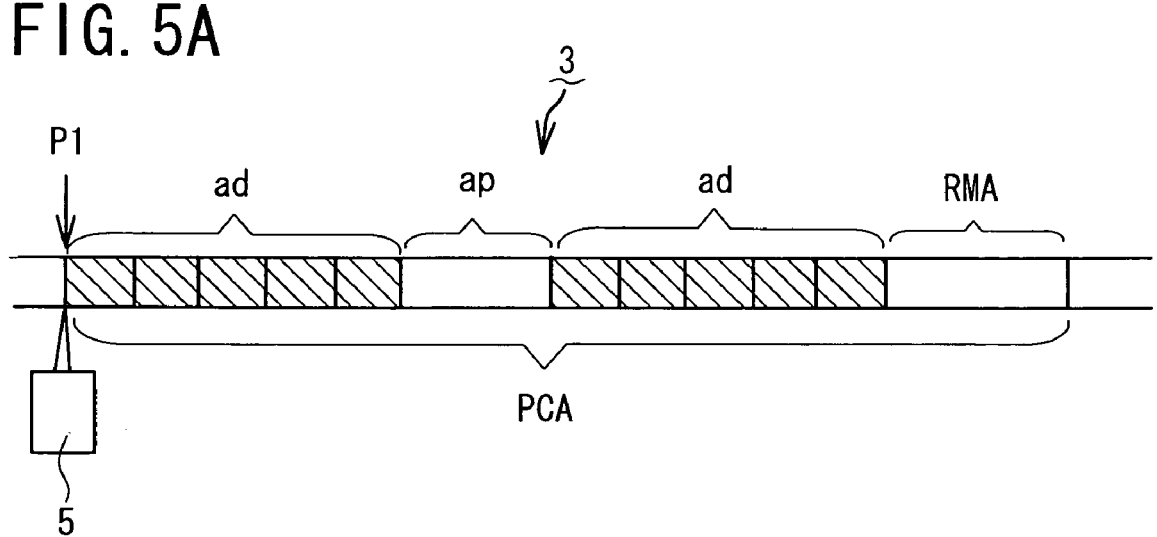
FIGS. 5A to 5C are schematic views showing a portion of the optical disc mainly of the PCA relative to the optical pickup, for explaining an operation mainly of the OPC which the optical disc apparatus performs with the optical disc having a usable area at an intermediate position between used areas of the PCA.
Figure 5B:
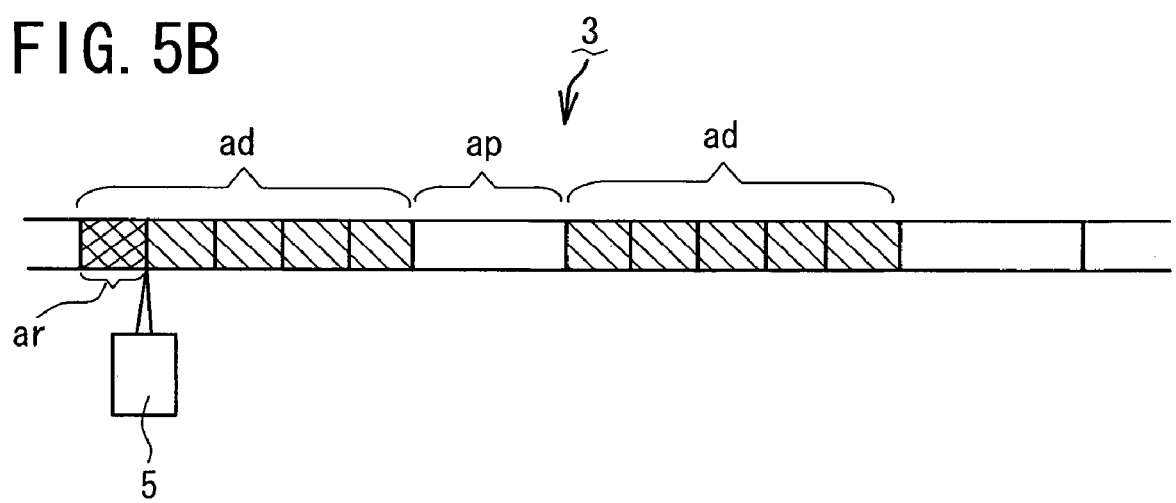
Figure 5C:
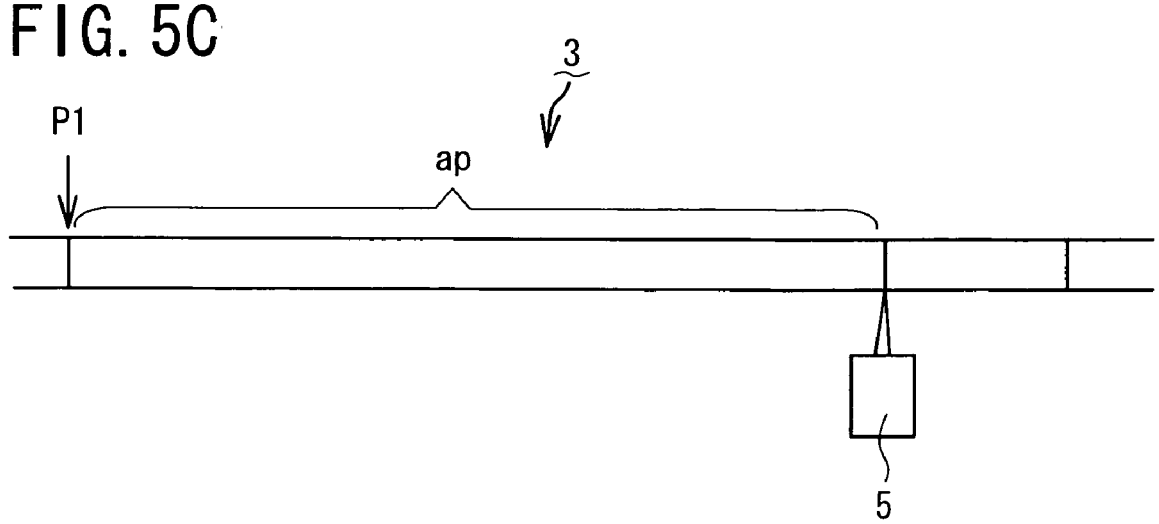

FIGS. 5A to 5C are schematic views showing a portion of the rewritable optical disc 3 mainly of PCA relative to the optical pickup 5, for explaining an operation mainly of OPC which the optical disc apparatus 1 performs with the optical disc 3 having a usable area (unused or free space) "ap" at an intermediate position between used areas "ad" (refer to FIGS. 5A and 5B) of the PCA. Referring to FIGS. 5A to 5C, when an OPC operation starts, the control circuit 9 first controls to move the optical pickup 5 to the innermost end P1 of the PCA (refer to FIG. 5A). If the PCA had a usable area at the innermost end P1 thereof, the control circuit 9 would control to move the optical pickup 5 from there to outward of the PCA to detect an innermost end of a used area. However, actually, a used area "ad" extends immediately from the innermost end P1 of the PCA. Accordingly, the control circuit 5 controls to perform OPC immediately from the innermost end P1 to the outward of the PCA by overwriting (refer to FIG. 5B), so as to obtain an optimum recording power. In FIG. 5B, the portion of the PCA having been subjected to the OPC by overwriting is indicated by a double hatched area "ar".

Using the thus obtained optimum recording power, the control circuit 5 obtains an optimum erase power (DC erase voltage) based on the known predetermined relationship among the optimum recording power and the optimum erase power. Using the thus obtained optimum erase power, the control circuit 5 controls to subject the entire substantial PCA to erasure (DC erase), thereby restoring the entire PCA area back to a usable area "ap" (refer to FIG. 5C). Note here that in the present specification, the term "entire substantial PCA" is used to mean the entire PCA which is formed of the used area "ad" (if any) and/or the usable area "ap" (if any), and which excludes e.g. the RMA area. Experiments conducted by the present inventor indicate that although an optimum recording power obtained by OPC using overwriting on a used area of PCA herein described is a little inferior in accuracy to an optimum recording power obtained by OPC on a usable (unused) area "ap", this inferiority does not cause an actual problem, so that the thus obtained optimum recording power can well be a reference value to determine the erase power (DC erase voltage).

Figure 6A:
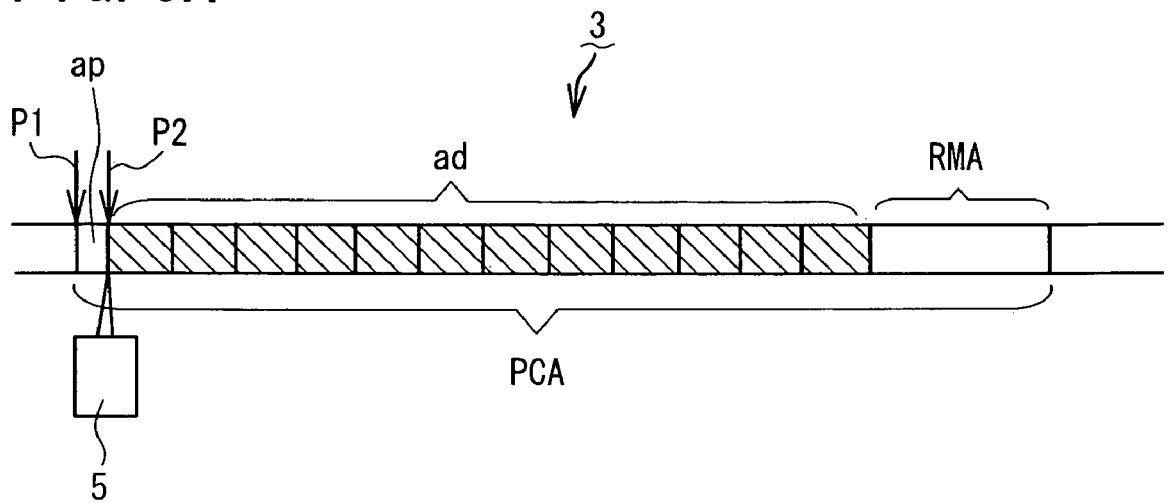
FIGS. 6A to 6C are schematic views showing a portion of the optical disc mainly of the PCA relative to the optical pickup, for explaining an operation mainly of the OPC which the optical disc apparatus performs with the optical disc having a used area in substantially the entire substantial PCA, except for a small usable area on an innermost portion of the PCA.
Figure 6B:
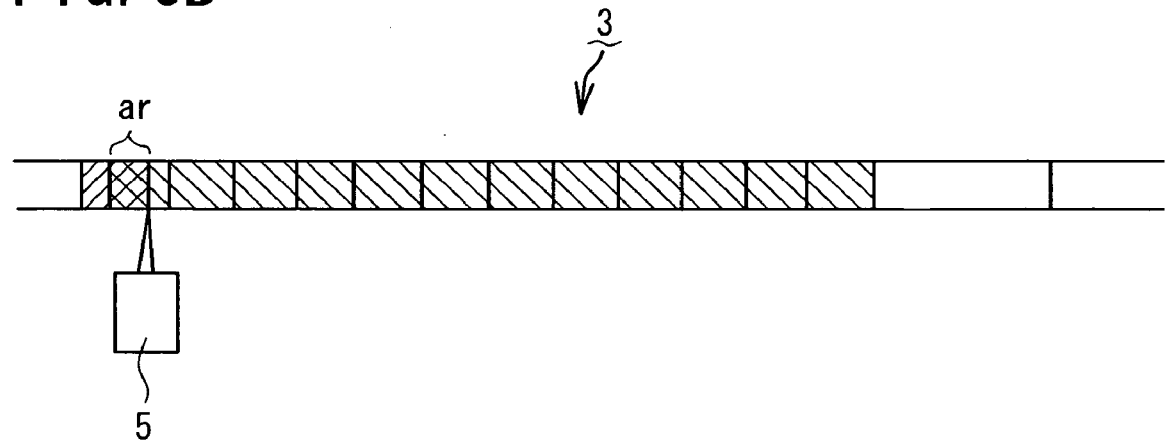
Figure 6C:
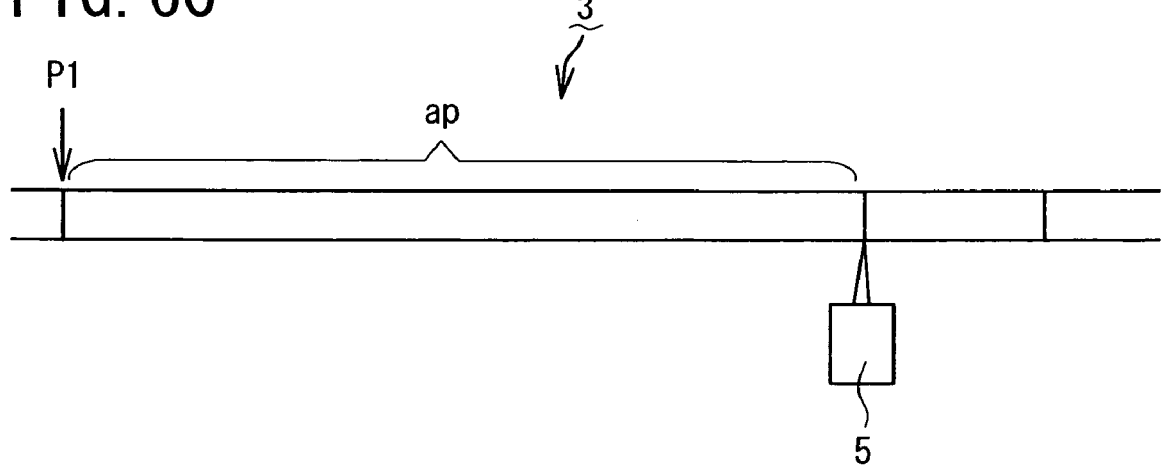

FIGS. 6A to 6C are schematic views showing a portion of the rewritable optical disc 3 mainly of PCA relative to the optical pickup 5, for explaining an operation mainly of OPC which the optical disc apparatus 1 performs with the optical disc 3 having a used area "ad" in approximately the entire substantial PCA (refer to FIGS. 6A and 6B), except for a small usable area "ap" on an innermost portion of the PCA. Referring to FIGS. 6A to 6C, when an OPC operation starts, the control circuit 9 first controls to move, from the innermost end P1 to outward of the PCA, the optical pickup 5 having been moved back to the innermost end P1 of the PCA. When the optical pickup 5 reaches the innermost end P2 of the used area "ad" over the used area "ap", the control circuit 9 controls to detect an RF signal of the used area "ad" at the innermost end P2, and thereby to stop the optical pickup 5 (refer to FIG. 6A).

Here, the control circuit 9 determines that the size of the usable area "ap" between the innermost end P2 of the used area "ad" and the innermost end P1 of the PCA is smaller than, i.e. less than enough, for one-time OPC. Thus, the control circuit 9 controls to move the optical pickup 5 back to the innermost end P1 of the PCA, and performs OPC by partial overwriting as shown by a double hatched area "ar" in FIG. 6B, while moving the optical pickup 5 again from the innermost end P1 to outward of the PCA. In the case of this optical disc 3, the usable area "ap" by itself is not enough for one-time OPC, but can be used for a part of the one-time OPC. In this case, the overwritten area "ar" in FIG. 6B can be smaller in size than the overwritten area "ar" in FIG. 5B because of the existence of the usable area "ap", and thus can allow a resultant optimum recording power obtained by the OPC to be a little superior in accuracy to the optimum recording power obtained by the overwriting as shown in FIG. 5B.

As a result of the OPC by the partial overwriting performed as above, the control circuit 9 along with the optical pickup 5 and other elements operating here obtains an optimum recording power. Using the thus obtained optimum recording power, the control circuit 5 obtains an optimum erase power (DC erase voltage) based on the known predetermined relationship between the optimum recording power and the optimum erase power. Using the thus obtained optimum erase power, the control circuit 5 controls to subject the entire substantial PCA to erasure (DC erase), thereby restoring the entire PCA area back to a usable area "ap" (refer to FIG. 6C). Also in this case, the optimum recording power obtained by OPC using the partial overwriting can well be a reference value to determine the erase power (DC erase voltage).

As apparent from the above descriptions with reference to FIGS. 4A to 4D, 5A to 5C and 6A to 6C, the control circuit 9 along with the optical pickup 5 and other elements operating there serves as claimed "optimum recording power obtaining unit" for obtaining an optimum recording power by performing OPC in a usable area "ap" if the usable area determination unit (control circuit 9 along with the optical pickup 5 and other elements) determines that the usable area is usable from the innermost end P1 of the PCA, and by performing OPC in a used area "ad" partially or entirely by partial or entire overwriting if the usable area determination unit determines that the PCA is absent of a usable area usable from the innermost end P1 of the PCA.

More specifically, the "optimum recording power obtaining unit" obtains an optimum recording power (i) by performing OPC in a usable area "ap" of PCA if the usable area determination unit (control circuit 9 along with the optical pickup 5 and other elements) determines that the usable area "ap" begins from the innermost end P1 of the PCA and is of a size large enough to enable the OPC at least one time, and (ii) by performing OPC in the PCA from the innermost end P1 of the PCA if the usable area determination unit determines that the PCA is absent of a usable area at the innermost end P1, or has a usable area "ap" at the innermost end P1 which is less than enough to enable, or is smaller than a size for carrying out, the OPC at least one time.

Here, if the PCA is absent of a usable area at the innermost end P1, the control circuit 9 performs overwriting on the PCA (on a used area "ad") for the OPC beginning from the innermost end P1. On the other hand, if the PCA has, at the innermost end P1, a usable area "ap" less than enough to enable the OPC at least one time, the control circuit 9 performs partial overwriting on the PCA for the OPC by normal writing on the usable area "ap" beginning from the innermost end P1 and by overwriting on the used area "ad" beginning from the innermost end P2 of the used area "ad" neighboring the usable area "ap".

It is also apparent from the above descriptions that the control circuit 9 along with the optical pickup 5 and other elements operating there serves as claimed "DC erase unit" for erasing the used area "ad" or the entire substantial PCA based on the optimum recording power obtained using the used area "ad" (for a part of or the entire OPC) if the "used area detection unit" (control circuit 9 along with the optical pickup 5 and other elements) determines that the PCA is absent of a usable area at the innermost end P1 thereof, or that the PCA has a usable area "ap" at the innermost end P1 thereof which is less than enough to enable the OPC at least one time.

As apparent from the above description, the optical disc apparatus 1 according to the embodiment of the present invention can prevent a situation where the optical disc apparatus 1 cannot perform OPC because it cannot detect a usable area (free space) in PCA of a rewritable optical disc 3 depending on the location of the usable area in the PCA (e.g. when a used area begins from an innermost end of the PCA). When mounting the optical disc 3 on the optical disc apparatus 1 and starting recording or erasure, the optical disc apparatus 1 can perform OPC at any time by performing the OPC from the innermost end of the PCA, regardless of where in the PCA the usable area is located. This will be described in more detail below.

If an optical disc 3 mounted on a conventional optical disc apparatus has PCA having a usable area "ap" at an intermediate location of the PCA such as shown in FIG. 5A, the conventional optical disc apparatus can detect the usable area "ap" by moving an optical pickup to seek from the radially innermost end to outward of the PCA, detecting the usable area "ap" on the way of the seek, although unable to detect the usable area "ap" at the innermost end of the PCA. However, this detection takes a long time. Further, if an optical disc 3 mounted on the conventional optical disc apparatus has PCA having a used area "ad" in approximately the entire substantial PCA as shown in FIG. 6A, the conventional optical disc apparatus cannot detect a usable area enough to enable one-time OPC even by moving the optical pickup to seek across the entire substantial PCA.

In the case where the conventional optical disc apparatus cannot detect a usable area at an innermost end of PCA by an optical pickup, a candidate solution to effectively detect a usable area in the PCA may be to move the optical pickup to a predetermined location in the PCA (e.g. mid-position of the PCA), or a randomly selected location in the PCA, and to attempt to detect a usable area at or near the predetermined location or the randomly selected location. However, this takes a long time to move the optical pickup. Further, for moving the optical pickup, it is necessary during the movement to determine a current position of the optical pickup based on LPP (Land Pre-Pits) pre-recorded on the optical disc. However, using the LPP, it is not easy to accurately detect the current position of the optical pickup, making it difficult to smoothly detect a usable area.

In contrast, when the optical disc apparatus 1 according to the embodiment of the present invention cannot detect a usable area ("ap") at a radially innermost end P1 of the optical disc 3 by using the optical pickup 5, the optical disc apparatus 1 immediately performs OPC in PCA of the optical disc 3 by overwriting starting from the innermost end P1 so as to obtain an optimum recording power (laser power). Thus, the optical disc apparatus 1 does not need time to detect a usable area ("ap"), which is unknown as to its presence or absence in the PCA, shortening time to start the OPC.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus for a rewritable optical disc having a power calibration area for optimum recording power calibration, the apparatus comprising:

an optical pickup for recording or erasing information on or from the optical disc by use of an optimum recording power obtained using the power calibration area;

a used area detection unit for detecting a second radially innermost end of a used area in the power calibration area based on a reproduction signal of a laser beam which the optical pickup receives during a seek movement, at the time of the optimum recording power calibration, by moving the optical pickup to seek from a first radially innermost end of the power calibration area to radially outward of the power calibration area;

a remaining usable area determination unit for determining, based on the second radially innermost end of the used area detected by the used area detection unit, whether the power calibration area has a remaining usable area which is an unused area beginning from the first radially innermost end of the power calibration area, and which is of a size for carrying out the optimum recording power calibration at least one time;

an optimum recording power obtaining unit for obtaining an optimum recording power (i) by performing the optimum recording power calibration in the power calibration area beginning from the first radially innermost end of the power calibration area by partial or entire overwriting if the remaining power calibration area is smaller than a size for carrying out one-time optimum recording power calibration, and (ii) by performing the optimum recording power calibration in a portion of the remaining usable area in the power calibration area, which portion is neighboring and inner from the second radially innermost end of the used area if the remaining usable area is equal to or larger than a size for carrying out one-time optimum recording power calibration;

a DC erase unit for erasing the used area in the power calibration area by use of the optimum recording power obtained by the optimum recording power obtaining unit using the used area in the power calibration area by the partial or entire overwriting, if the remaining usable area detection unit determines that the remaining usable area in the power calibration area is smaller than a size for carrying out one-time optimum recording power calibration; and wherein the optimum recording power obtaining unit obtains the optimum recording power by overwriting to perform normal optimum recording power calibration that continuously records test data on the power calibration area while increasing the recording power during which the test data, when reproduced, shows an inflection point before which the reproduced test data shows an increase of amplitude with an increase of the recording power and after which the reproduced test data shows a decrease of amplitude with an increase of the recording power, the recording power giving the inflection point being determined as the optimum recording power.

2. The optical disc apparatus according to claim 1, wherein the optimum recording power obtaining unit obtains the optimum recording power by overwriting on the used area from the first radially innermost end of the power calibration area if the second radially innermost end of the used area coincides with the first radially innermost end of the power calibration area.

* * * * *